United States Patent [19]

Takeo et al.

[11] Patent Number: 5,032,733
[45] Date of Patent: Jul. 16, 1991

[54] METHOD FOR DETECTING UNEXPOSED REGIONS

[75] Inventors: Hideya Takeo; Takeshi Funahashi, both of Kanagawa, Japan

[73] Assignee: Fuji Photo Film Co., Ltd., Kanagawa, Japan

[21] Appl. No.: 416,209

[22] Filed: Oct. 2, 1989

[30] Foreign Application Priority Data

Oct. 4, 1988 [JP] Japan ................... 63-250336
Oct. 20, 1988 [JP] Japan ................... 63-265143

[51] Int. Cl.$^5$ .................................. G01N 21/86
[52] U.S. Cl. ..................... 250/559; 250/337
[58] Field of Search ......... 250/327.2, 337, 484.1,
250/571, 559; 364/413.19, 413.2; 356/443, 444;
358/111

[56] References Cited

U.S. PATENT DOCUMENTS

| | | | |
|---|---|---|---|
| 4,239,384 | 12/1980 | Treiber | 250/559 |
| 4,258,264 | 3/1981 | Kotera et al. | 250/327.1 |
| 4,276,473 | 6/1981 | Kato et al. | 250/377.1 |
| 4,315,318 | 2/1982 | Kato et al. | 250/337 |
| 4,387,428 | 6/1983 | Ishida et al. | 250/337 |
| 4,527,060 | 6/1985 | Suzuki et al. | 250/327.2 |
| 4,575,251 | 3/1986 | Hotta et al. | 356/443 |
| 4,585,352 | 4/1986 | Ritzerfeld et al. | 356/444 |
| 4,655,581 | 4/1987 | Yamada | 250/559 |

FOREIGN PATENT DOCUMENTS 56-11395 2/1981 Japan .
61-5193 2/1986 Japan .

Primary Examiner—David C. Nelms
Attorney, Agent, or Firm—Sughrue, Mion, Zinn, Macpeak & Seas

[57] ABSTRACT

After an image signal made up of a series of image signal components is detected from a recording medium on which a radiation image may be recorded, a characteristic value which represents the maximum change in the value of the image signal components corresponding to positions located along each of a plurality of lines distributed over the overall region or over a partial region of the recording medium is calculated. A representative value, which is representative of a plurality of the characteristic values, is calculated. Alternatively, after the image signal is detected, the probability density function of the image signal components corresponding to the overall region or to a partial region of the recording medium is created, and a characteristic amount, which represents a specific characteristic of the probability density function is found. The representative value or the characteristic amount is compared with a predetermined value. A judgment as to whether the region has or has not been exposed to radiation is based on the results of the comparison.

2 Claims, 5 Drawing Sheets

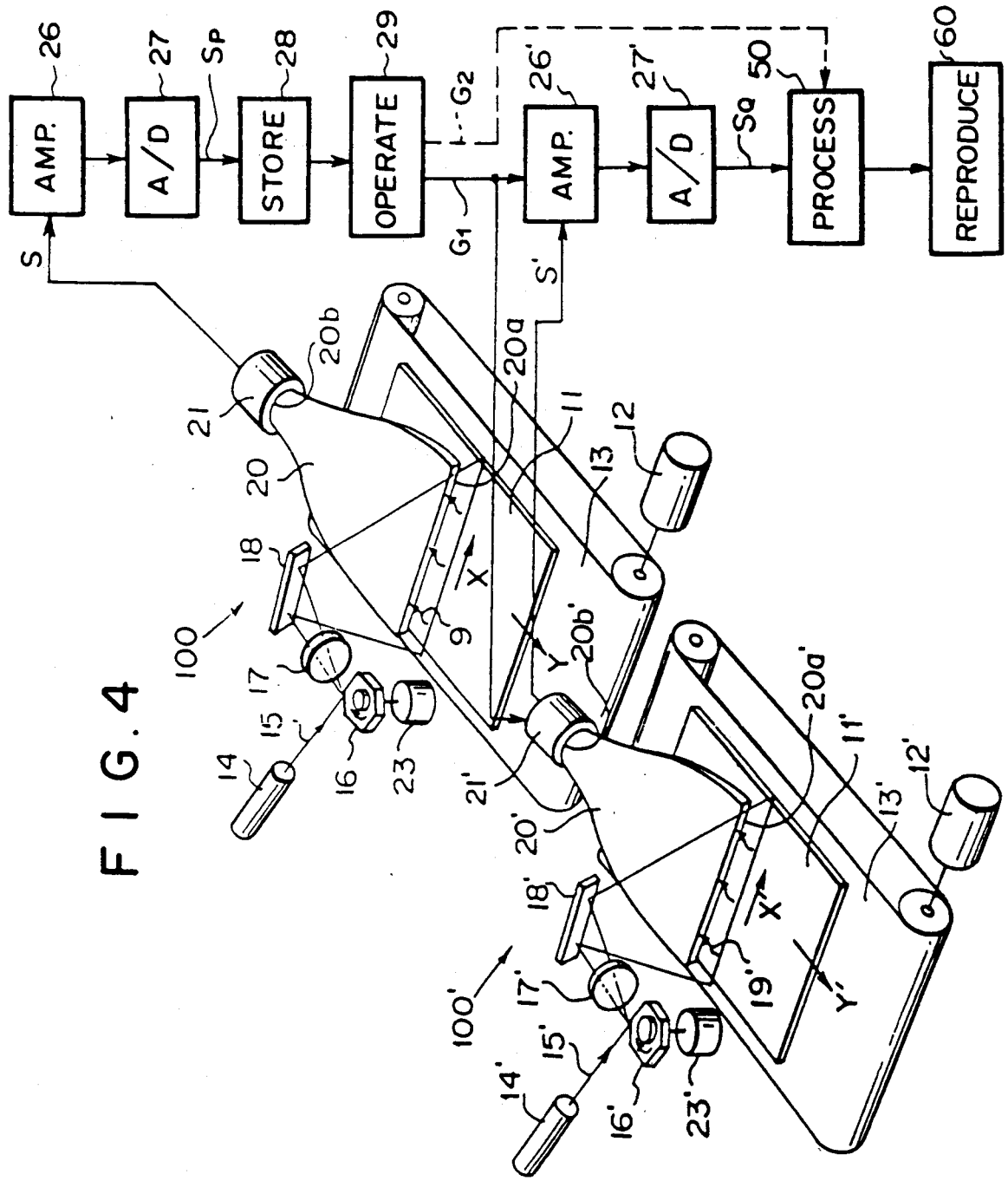

METHOD FOR DETECTING UNEXPOSED REGIONS

BACKGROUND OF THE INVENTION

1. Field of the Invention

This invention relates to a method for detecting an unexposed region of a recording medium, wherein a judgment as to whether the overall region or a partial region of the recording medium has or has not been exposed is based on the values of certain components of an image signal detected from the recording medium, which may have a radiation image stored thereon.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen for the type of image processing to be carried out, the X-ray image is read out from the X-ray film and converted into an electric signal, and the electric signal (image signal) is processed and then used for reproducing the X-ray image as a visible image on a copy photograph or the like. In this manner, a visible image having good image quality with high contrast, high sharpness, high graininess or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor, which has been exposed to the radiation, is exposed to stimulating rays such as visible light, light is emitted by the phosphor in proportion to the amount of energy stored during exposure to the radiation. A phosphor exhibiting such properties is referred to as a stimulable phosphor. As disclosed in Japanese Unexamined Patent Publication Nos. 55(1980)-12429, 56(1981)-11395, 55(1980)-163472, 56(1981)-104645, and 55(1980)-116340, it has been proposed to use stimulable phosphors in radiation image recording and reproducing systems. Specifically, a sheet provided with a layer of the stimulable phosphor (hereinafter referred to as a stimulable phosphor sheet) is first exposed to radiation, which has passed through an object such as the human body, in order to store a radiation image of the object thereon, and is then scanned with stimulating rays, such as a laser beam, which cause it to emit light in proportion to the amount of energy stored thereon during the exposure to the radiation. The light emitted by the stimulable phosphor sheet upon stimulation thereof is photoelectrically detected and converted into an electric image signal, and the image signal is used to reproduce the radiation image of the object as a visible image on a recording material such as photographic film, on a display device such as a cathode ray tube (CRT), or the like.

Radiation image recording and reproducing systems which use stimulable phosphor sheets are advantageous over conventional radiography using silver halide photographic materials in that images can be recorded even when the energy intensity of the radiation to which the stimulable phosphor sheet is exposed varies over a wide range. More specifically, since the amount of light emitted by the stimulable phosphor varies over a wide range and is proportional to the amount of energy stored during its exposure to the radiation, it is possible to obtain a visible image having a desirable density regardless of the energy intensity of the radiation to which the stimulable phosphor sheet was exposed. In order to obtain a desirable image density, an appropriate read-out gain is set when the emitted light is being detected with a photoelectric read-out means and converted into an electric signal to be used in the reproduction of a visible image on a recording material, such as photographic film, or on a display device such as a CRT.

In order to detect an image signal accurately, certain factors which affect the image signal must be set in accordance with the dose of radiation delivered to the stimulable phosphor sheet and the like. A novel radiation image recording and reproducing system which accurately detects an image signal has been proposed in, for example, Japanese Unexamined Patent Publication Nos. 58(1983)-67240, 58(1983)-67241 and 58(1983)-67242. The proposed radiation image recording and reproducing system is constituted such that a preliminary read-out operation (hereinafter simply referred to as the "preliminary readout") is carried out in order approximately to ascertain the radiation image stored on the stimulable phosphor sheet. In the preliminary readout, the stimulable phosphor sheet is scanned with a light beam having a comparatively low energy level, and a preliminary read-out image signal obtained during the preliminary readout is analyzed. Thereafter, a final read-out operation (hereinafter simply referred to as the "final readout") is carried out to obtain the image signal, which is to be used during the reproduction of a visible image. In the final readout, the stimulable phosphor sheet is scanned with a light beam having an energy level higher than the energy level of the light beam used in the preliminary readout, and the radiation image is read out with the factors affecting the image signal adjusted to appropriate values on the basis of the results of an analysis of the preliminary read-out image signal. The term "read-out conditions" as used hereinafter means a group of various factors, which are adjustable and which affect the relationship between the amount of light emitted by the stimulable phosphor sheet during image readout and the output of a read-out means. For example, the term "read-out conditions" may refer to a read-out gain and a scale factor, which define the relationship between the input to the read-out means and the output therefrom, or to the power of the stimulating rays used when the radiation image is read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed. Regardless of whether the preliminary read-out is or is not carried out, it has also been proposed to analyze the image signal (including the preliminary read-out image signal) obtained and to adjust image processing conditions, which are to be used when the image signal is processed, on the basis of the results of an analysis of the image signal. The proposed method is applicable to cases where an image signal is obtained from a radiation image recorded on a recording medium such as conventional X-ray film, as well as to systems using stimulable phosphor sheets.

In the aforesaid radiation image recording and reproducing systems, a subdivision image recording operation is often carried out wherein the whole recording area of a single recording medium (such as a stimulable phosphor sheet or X-ray film) is divided into a plurality of regions and different radiation images are recorded in each region. In such cases, for example, the subdivision pattern is found from the preliminary read-out image signal, and appropriate read-out conditions are calculated for each of the subdivided regions. A final readout is then carried out under conditions set according to the calculations thus performed. However, in a case where, for example, the whole recording area of a recording medium was divided into four regions and radiation images were recorded in only three of the four regions with the remaining region remaining unexposed to radiation, the image signal obtained from an image read-out operation performed on the recording medium includes image signal components corresponding to the unexposed region. In such cases, if the read-out conditions for the final readout are calculated in the same manner as that described above, the read-out conditions, which are ultimately set for the final readout, will be set incorrectly. This is because the ultimate read-out conditions for the final readout are determined from image signal components corresponding to both exposed and unexposed regions. Therefore, during the final readout, image signal components having inappropriate values are obtained from regions in which radiation images were actually recorded.

Besides cases where the whole recording area of a recording medium is divided into a plurality of regions and a plurality of radiation images are recorded in the subdivided regions, a recording medium which has not been exposed to radiation may accidentally be put in a read-out apparatus in order that an image read-out operation may be carried out on the recording medium. In such cases, when the read-out conditions for the final readout are calculated from the preliminary read-out image signal obtained during the preliminary readout, the calculated read-out conditions are markedly different from normal read-out conditions. Therefore, if the read-out conditions for the final readout are set according to the calculations, the voltage applied to a photomultiplier serving as a read-out means, for example, or the amplification factor of an amplifier will be made markedly large. As a result, various adverse effects arise. For example, the performance of parts of the read-out apparatus may deteriorate.

SUMMARY OF THE INVENTION

In view of the above circumstances, the object of the present invention is to provide a method for detecting an unexposed region of a recording medium, wherein a judgment as to whether the overall region or a partial region of the recording medium has or has not been exposed to radiation is based on the characteristics of an image signal (including a preliminary read-out image signal) which is made up of a series of image signal components detected from a recording medium on which a radiation image may be recorded.

The present invention provides a first method for detecting an unexposed region, which comprises the steps of:

i) after an image signal made up of a series of image signal components is detected from a recording medium on which a radiation image may be recorded, calculating a characteristic value, which represents the change in the values of the image signal components corresponding to positions located along each of a plurality of lines distributed over the overall region or over a partial region of said recording medium, from said image signal components corresponding to positions located along each said line, ii) calculating a representative value which is representative of a plurality of the characteristic values calculated for the plurality of said lines, iii) comparing said representative value with a predetermined value, and iv) basing a judgment as to whether said region has or has not been exposed to radiation on the results of the comparison made between said representative value and said predetermined value.

The term "characteristic value which represents the change in the values of the image signal components corresponding to positions located along each of a plurality of lines" as used herein means a characteristic value representing the degree of change between neighboring image signal components located along each line. By way of example, the characteristic value means the maximum value of the differentiated image signal values which result when differentiation is carried out on the image signal components corresponding to positions located along each line, the mean value of the absolute values of the differentiated image signal values, the root-mean-square value of the differentiated image signal values, the median value of the differentiated image signal values, the number of the differentiated image signal values which exceed a predetermined threshold value, or the variance of the image signal components located along each line.

The term "representative value which is representative of a plurality of characteristic values" as used herein means, for example, the mean value or the median value, of the characteristic values calculated for a plurality of lines. Also, the sum of the plurality of the characteristic values may be regarded as being identical with the mean value, and therefore is embraced in the category of the mean value.

No limitation is imposed on the number of intermediate processes required for the calculation of the representative value. Therefore, the present invention also embraces cases where the characteristic values corresponding to the individual lines do not appear clearly during the calculations, for example, as in the case described below. Specifically, when the mean value of the absolute values of the differentiated image signal values resulting from differentiation carried out on the image signal components corresponding to positions located along each of a plurality of lines is employed as the characteristic value, and the mean value of a plurality of the characteristic values corresponding to the plurality of lines is employed as the representative value, the absolute values of the differentiated image signal values corresponding to all lines may be found and divided by the total number of differentiated image signal values corresponding to all lines. In such cases, the representative value is calculated without the characteristic values corresponding to the respective lines being calculated clearly as intermediate results.

The present invention also provides a second method for detecting an unexposed region, which comprises the steps of:

i) after an image signal made up of a series of image signal components is detected from a recording medium on which a radiation image may be recorded, creating a probability density function of the image signal components corresponding to the overall region or to a partial region of said recording medium, ii) finding a characteristic amount which represents a specific characteristic of said probability density function, iii) comparing said characteristic amount with a predetermined amount, and iv) basing a judgment as to whether said region has or has not been exposed to radiation on the results of the comparison made between said characteristic amount and said predetermined amount.

The term "characteristic amount which represents a specific characteristic of the probability density function" as used herein means an amount representing a specific characteristic of the probability density function of the image signal components corresponding to the overall region or to a partial region of the recording medium. One specific characteristic of the probability density function is that the values of the image signal components corresponding to an unexposed region are approximately uniform (i.e. the image density is approximately uniform in the unexposed region) and/or the values of these image signal components are small in cases where the values of the image signal are proportional to the amount of radiation to which the recording medium is exposed during the recording of the radiation image. For example, the characteristic amount may be the maximum value of the probability density function, the image signal value which occurs most frequently, i.e. the image signal value corresponding to the maximum frequency value of the probability density function, the width of the probability density function, the maximum value of the image signal components, or the median value of the image signal components.

An unexposed region has the characteristic nature that the values of the image signal components corresponding thereto are approximately uniform and exhibit little change.

The first method for detecting an unexposed region in accordance with the present invention utilizes the characteristic that the change in the values of the image signal components corresponding to an unexposed region is low. Specifically, with the first method for detecting an unexposed region in accordance with the present invention, a characteristic value, which represents the change in the values of image signal components, is calculated for each of a plurality of lines distributed over the overall region or over a partial region of the recording medium. It is possible to judge approximately from the characteristic values corresponding to the respective lines whether the region has or has not been exposed to radiation. However, with the first method for detecting an unexposed region in accordance with the present invention, a representative value which is representative of the characteristic values corresponding to the plurality of lines distributed over the whole region is calculated. Thereafter, a judgment as to whether the region has or has not been exposed to radiation is based on the representative value. Because the whole region is taken into account when the judgment is made, it is possible to judge whether the region has or has not been exposed to radiation wiht a substantial amount of reliability.

With the second method for detecting an unexposed region in accordance with the present invention, the probability density function of the image signal components corresponding to each subdivision (or region) of the recording medium is created, and a characteristic amount which represents a specific characteristic of the probability density function is found. Thereafter, from the characteristic amount, a judgment is made as to whether the region has or has not been exposed to radiation. Because the judgment as to whether the region has or has not been exposed to radiation is made from the characteristics of image signal components corresponding to the overall area of the region, the judgment can be made substantially reliably. Accordingly, the readout conditions for the final readout and/or the image processing conditions can be set more correctly. Also, for example, in cases where the entire area of the recording medium has been detected as being unexposed, it is possible to stop the subsequent operations.

BRIEF DESCRIPTION OF THE DRAWINGS

FIG. 4 is a perspective view showing an example of the radiation image read-out apparatus wherein an embodiment of the method for detecting an unexposed region in accordance with the present invention is employed.

DESCRIPTION OF THE PREFERRED EMBODIMENTS

Figure 1:
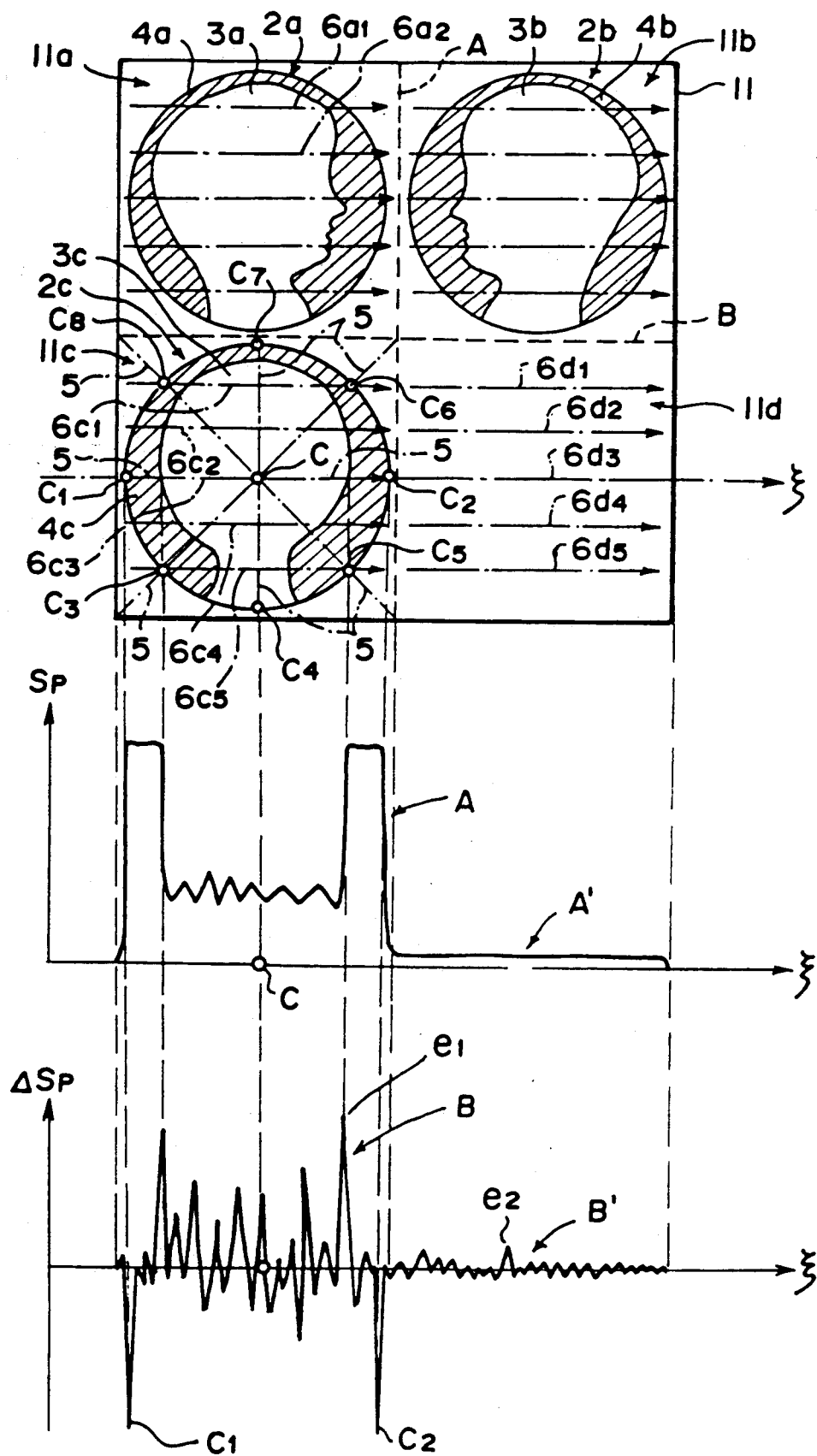
FIG. 1 is an explanatory view showing examples of radiation images, a preliminary read-out image signal representing the radiation images, and differentiated values of the preliminary read-out image signal.

The present invention will hereinbelow be described in further detail with reference to the accompanying drawings.

FIG. 4 is a perspective view showing an example of a radiation image read-out apparatus wherein an embodiment of the method for detecting an unexposed region of a recording medium in accordance with the present invention is employed. In this embodiment, a stimulable phosphor sheet is utilized and a preliminary readout is carried out.

A stimulable phosphor sheet 11 on which a radiation image has been stored is placed at a predetermined position in a preliminary read-out means 100 which carries out a preliminary readout by scanning the stimulable phosphor sheet 11 with a light beam having a low energy level, thereby releasing only part of the energy from the stimulable phosphor sheet 11 which was stored thereon during its exposure to radiation. The stimulable phosphor sheet 11 is conveyed in a sub-scanning direction indicated by the arrow Y by a sheet conveyance means 13, which is constituted of an endless belt or the like and which is operated by a motor 12. A laser beam 15, which has a low energy level and is produced by a laser beam source 14, is reflected and deflected by a rotating polygon mirror 16, which is quickly rotated by a motor 23 in the direction indicated by the arrow, and passes through a converging lens 17 constituted of an f$\theta$ lens or the like. The direction of the optical path of the laser beam 15 is then changed by a mirror 18, and the laser beam 15 impinges upon the stimulable phosphor sheet 11 and scans it in a main scanning direction indicated by the arrow X, which direction is approximately normal to the sub-scanning direction indicated by the arrow Y. When the stimulable phosphor sheet 11 is exposed to the laser beam 15, the exposed portion of the stimulable phosphor sheet 11 emits light 19 in an amount proportional to the amount of energy stored thereon during its exposure to radiation. The emitted light 19 is guided by a light guide member 20, and photoelectrically detected by a photomultiplier 21, which acts as a photodetector. The light guide member 20 is made from a light guiding material such as an acrylic plate, and has a linear light input face 20a, which is positioned so that it extends along the main scanning line on the stimulable phosphor sheet 11, and a ring-shaped light output face 20b, which is positioned so that it is in close contact with a light receiving face of the photomultiplier 21. The emitted light 19, which has entered the light guide member 20 at its light input face 20a, is guided through repeated total reflection inside of the light guide member 20, emanates from the light output face 20b, and is received by the photomultiplier 21. In this manner, the amount of the emitted light 19, which represents the radiation image, is converted into an electric signal by the photomultiplier 21.

An analog output signal S is generated by the photomultiplier 21 and is logarithmically amplified by a logarithmic amplifier 26. It is then digitized by an A/D converter 27 into a preliminary read-out image signal SP. The preliminary read-out image signal SP is proportional to the logarithmic value of the amount of the emitted light 19.

In the preliminary readout, read-out conditions, such as the voltage applied to the photomultiplier 21 or the amplification factor of the logarithmic amplifier 26, are adjusted so that image information can be ascertained even if the amount of energy stored on the stimulable phosphor sheet 11 varies over a wide range.

The preliminary read-out image signal SP obtained in the manner described above is fed into a storage means 28 and stored therein. Thereafter, the preliminary read-out image signal SP is read from the storage means 28, and fed into an operation means 29. In cases where the recording region of the stimulable phosphor sheet 11 was divided into a plurality of regions, on each of which regions a radiation image could be recorded, the operation means 29 determines the subdivision pattern from the preliminary read-out image signal SP and thereafter judges whether each of the divided regions has or has not been exposed to radiation. The operation means 29 then calculates the read-out conditions G1 for the final readout, such as the voltage to be applied to a photomultiplier 21' or the amplification factor to be set in a logarithmic amplifier 26', on the basis of only those components of the preliminary read-out image signal SP which correspond to the regions of the recording medium which have been exposed.

A stimulable phosphor sheet 11', on which the preliminary readout has been finished, is placed at a predetermined position in the final read-out means 100' and scanned with a laser beam 15' having an energy level higher than that of the laser beam 15 used in the preliminary readout. In this manner, an image signal is detected using the read-out conditions G1 which have been adjusted as described above. The configuration of the final read-out means 100' is nearly the same as that of the preliminary read-out means 100, and therefore elements corresponding to those constituting the preliminary read-out means 100 are numbered with corresponding primed reference numerals in FIG. 4.

After the image signal is digitized in an A/D converter 27', the resulting image signal SQ is fed into an image processing means 50, which carries out appropriate image processing on the image signal SQ. After being image processed, the image signal is fed into a reproducing apparatus 60, which reproduces a visible image from the image signal.

How the operation means 29 determines the subdivision pattern from the preliminary read-out image signal SP and judges whether each of the divided regions has or has not been exposed to radiation will be described hereinbelow.

By way of example, the subdivision pattern may be determined with the method described below, which has been proposed by the applicant in Japanese Patent Application No. 62(1987)-092759.

FIG. 1 shows examples of radiation images stored on a stimulable phosphor sheet, a preliminary read-out image signal SP obtained during a read-out operation carried out on the stimulable phosphor sheet by the preliminary read-out means 100 of the read-out apparatus shown in FIG. 4, and differentiated values $\Delta SP$ obtained when a differentiation processing operation is performed on the preliminary read-out image signal SP.

With reference to FIG. 1, the recording region of a stimulable phosphor sheet 11 is divided along lines A and B into four regions 11a, 11b, 11c, and 11d. Radiation images have been stored respectively in the regions 11a, 11b, and 11c, and the region 11d has not been exposed to radiation. In the regions 11a, 11b, and 11c, object images 3a, 3b, and 3c (the head of a human body serving as the object in this case) are respectively stored in the regions inside of irradiation fields 2a, 2b, and 2c. Also, background regions 4a, 4b, and 4c, upon which radiation impinged directly, are present, respectively, in the regions inside of irradiation fields 2a, 2b, and 2c. In this example of the system, radiation images may be stored in any of the following four types of subdivision patterns on a single stimulable phosphor sheet: (1) the recording region of the stimulable phosphor sheet 11 is not subdivided, (2) the recording region of the stimulable phosphor sheet 11 is divided into two regions along line A, (3) the recording region of the stimulable phosphor sheet 11 is divided into two regions along line B, or (4) the recording region of the stimulable phosphor sheet 11 is divided into four regions along lines A and B. Therefore, the shape and location of the irradiation field are determined for each of the four regions; i.e. they are determined for the smallest of the subdivided regions. In this embodiment, the shape and location of the irradiation field are determined with the method described below, which has been proposed in Japanese Patent Application No. 62(1987)-93633.

By way of example, as for the region 11c, differentiation operations are carried out on the image signal components of the preliminary read-out image signal SP corresponding to the picture elements arrayed along each of a plurality of lines 5, 5, ... which extend radially from the center point C of the region 11c. The point for which the corresponding value of the preliminary read-out image signal SP decreases sharply is detected as a contour point of the region, and the set of all detected contour points in a region is considered to define the shape and location of the irradiation field:

How contour points are detected on a particular line, the $\xi$ axis, will be described hereinbelow.

Curve A represents the values of the image signal components of the preliminary read-out image signal SP corresponding to the picture elements arrayed along the $\xi$ axis.

The values of the image signal components of the preliminary read-out image signal SP are largest for a background region 4 which is located inside of the irradiation field 2 and upon which radiation impinged directly. The values of the image signal components of the preliminary read-out image signal SP corresponding to the contour points of the irradiation field 2 decrease sharply, and the values corresponding to the boundaries between the object image 3 and the neighboring parts of the background region 4 change sharply.

Curve B represents the results of differentiation carried out on the image signal components of the preliminary read-out image signal SP represented by curve A starting from that signal component corresponding to the center point C and continuing with signal components corresponding to positions lying in the negative direction along the u axis (i.e. leftward in FIG. 1) and in the positive direction along the $\xi$ axis (i.e. rightward in FIG. 1).

Curve B has a major peak c1 which projects downwardly for that part of the line extending from the center point C in the negative direction along the $\xi$ axis. Therefore, the position corresponding to the peak c1 is detected as a contour point.

For the part of the line extending from the center point C in the positive direction along the $\xi$ axis, curve B has a major peak c2 which projects downwardly. Therefore, the position corresponding to the peak c2 is detected as a contour point.

In the manner described above, contour points al (l denotes a positive integer and l=1 to 8 in the embodiment of FIG. 1) are detected respectively on the plurality of lines 5, 5, ... each of which connects the center point C with the edge of the region 11c. After the contour points al are detected, lines which connect the contour points al are regarded as the contour of the irradiation field.

Figure 2:
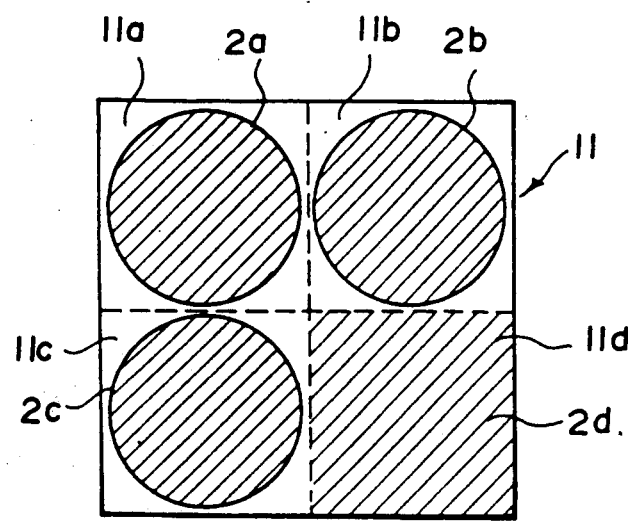
FIG. 2 is a schematic view showing the shapes and locations of the irradiation fields of the radiation images shown in FIG. 1, FIGS. 3A and 3B are schematic views showing different examples of the shapes and locations of irradiation fields.

FIG. 2 is a schematic view showing the shapes and locations of irradiation fields in the radiation images shown in FIG. 1, which have been determined in the manner described above.

Circular irradiation fields 2a, 2b, and 2c are found to be present respectively in the regions 11a, 11b and 11c among the regions 11a through 11d of the stimulable phosphor sheet 11. In the region 11d, no peak which projects downwardly is found with the method described above. Therefore, the whole area of region 11d is regarded as the irradiation field 2d.

Figures 3A, 3B:
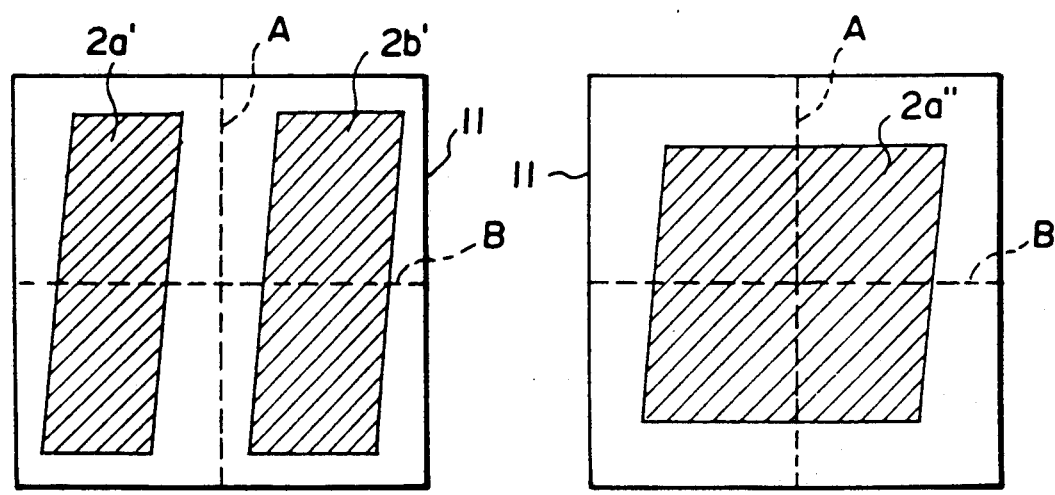

FIGS. 3A and 3B are schematic views showing examples of irradiation fields having various shapes and locations, the shapes and locations having been determined by the method described above. As shown in FIG. 3A, in cases where the irradiation fields 2a' and 2b' continue across line B, the subdivision pattern is found to be a two-on-one horizontal type of pattern. As shown in FIG. 3B, in cases where an irradiation field 2c'' continues across lines A and B, the subdivision pattern is found to be a null pattern; i.e. the recording medium has not been subdivided. In this embodiment, since the irradiation fields 2a through 2d shown in FIG. 2 are discontinuous with respect to one another, the subdivision pattern is found to be a four-on-one type of pattern.

After the characteristics of the subdivision pattern have been determined in the manner described above, a judgment is made as to whether each of the regions 11a through 11d has or has not been exposed to radiation. Specifically, as shown in FIG. 1, the values of the image signal components along five lines are found for each of the regions 11a through 11d (for example, the values of the components along lines 6a1 through 6a5 are found in the region 11a). Thereafter, a characteristic value is calculated which represents the change in the image signal components of the preliminary read-out image signal SP corresponding to positions located along each of the lines. In this embodiment the maximum value $\Delta SPmax$ of the differentiated image signal values $\Delta SP$ is employed as the characteristic value. The differentiated image signal values $\Delta SP$ result from differentiation carried out on the image signal components of the preliminary read-out image signal SP which correspond to positions located along each of the lines.

How the characteristic values corresponding to the lines 6c3 and 6d3 in FIG. 1 are found will be described hereinbelow. As described above, the values of the image signal components of the preliminary read-out image signal SP corresponding to positions located along the line 6c3 in region 11c are indicated by curve A. Also, the differentiated image signal values $\Delta SP$, which result when differentiation is carried out on these image signal components, are indicated by curve B. In curve B, the highest peak of the differentiated image signal values $\Delta SP$ is at point e1. Therefore, the differentiated image signal value $\Delta SP$ corresponding to point e1 is employed as the characteristic value for line 6c3.

Curve A' represents the values of the image signal components of the preliminary read-out image signal SP corresponding to the positions located along the line 6d3 in the region 11d which has not been exposed. Also, curve B' represents the differentiated values $\Delta SP$ which result when differentiation is carried out on these image signal components of the preliminary read-out image signal SP. In curve B', the highest peak of the differentiated image signal values ΔSP is at point e2. Therefore, the differentiated image signal value ΔSP corresponding to point e2 is employed as the characteristic value for line 6d3.

After the characteristic values are found for each of the five lines in each region, the median value of the characteristic values corresponding to each region is calculated and regarded as the representative value, i.e. the value which is representative of the characteristic values. The differentiated image signal values ΔSP which result when differentiation is carried out on the image signal components of the preliminary read-out image signal SP corresponding to an unexposed region may exhibit a few high peaks due to noise or the like. Therefore, in order to average out such peaks, the median value of the characteristic values corresponding to each region is employed as the representative value. As indicated by curve B', the differentiated image signal values ΔSP which result when differentiation is carried out on the image signal components of the preliminary read-out image signal SP corresponding to the unexposed region do not exhibit many peaks. This feature is markedly different from that of curve B which corresponds to a region in which a radiation image has been stored. Therefore, the median value of the characteristic values corresponding to each region is compared with a predetermined value in order to allow a judgment to be made as to whether the region has or has not been exposed to radiation. In this embodiment, the regions 11a, 11b, and 11c are determined to be exposed regions (i.e. to have radiation images stored thereon), and the region 11d is determined to be an unexposed region.

After a region is determined not to have a radiation image stored thereon (the region is unexposed), the read-out conditions G1 for the final readout, which is carried out as shown in FIG. 4, are adjusted on the basis of the values of the image signal components of the preliminary read-out image signal corresponding to regions inside of the irradiation fields 2a, 2b, and 2c, so that during the final readout, the image signal representing the image information stored in the regions inside of the irradiation fields 2a, 2b and 2c is detected appropriately. Because the read-out conditions G1 for the final readout are adjusted on the basis of only those image signal components of the preliminary read-out image signal which correspond to exposed regions of the recording medium, in the final readout the stored radiation images can be read out using more appropriate read-out conditions.

If an unexposed stimulable phosphor sheet 11 having no radiation image stored thereon is subjected to a preliminary readout and the read-out conditions G1 for the final readout are mechanically adjusted on the basis of preliminary read-out image signal SP, the problems described below will arise. Specifically, during the final readout, the amplification factor of the photomultiplier 21' shown in FIG. 4 must be increased markedly in order to ensure that the image signal detected from the weak light emitted by the stimulable phosphor sheet 11 has a predetermined value. For this purpose, a very high voltage is applied to the photomultiplier 21'. As a result, the deterioration of the photomultiplier 21' is promoted. Also, time is consumed uselessly if the processing of the stimulable phosphor sheet 11 is continued.

Accordingly, regardless of whether or not a stimulable phosphor sheet 11 was subdivided, a judgment may be made from the characteristics of the entire preliminary read-out image signal SP (which corresponds to the overall area of the stimulable phosphor sheet 11) as to whether the stimulable phosphor sheet 11 does or does not have a radiation image stored thereon.

In the aforesaid embodiment, the maximum values of the differentiated values are employed as the characteristic values for each line, and the median value of the maximum values is employed as the representative value. However, the maximum values of the differentiated values need not necessarily be employed as the characteristic values, and the the median value of the maximum values of the differentiated values need not necessarily be employed as the representative value. Various other values may be employed as the characteristic values and the representative value.

In the aforesaid embodiment, the preliminary read-out means 100 and the final read-out means 100' are separate from each other. Alternatively, because the configurations of the preliminary read-out means 100 and the final read-out means 100' are approximately identical to each other, a single read-out means may perform both the preliminary readout and the final readout. In this case, after being subjected to the preliminary readout, the stimulable phosphor sheet 11 may be moved back to the position at which image readout is started. Thereafter, the final readout may be carried out.

In cases where a single read-out means performs both the preliminary readout and the final readout, it is necessary to change the intensity of the light beam used in the preliminary readout and the final readout. For this purpose, various methods may be employed as described above; for example, a laser beam source or the like may change the intensity of the light beam.

In the aforesaid embodiment, the read-out conditions for the final readout are adjusted by the operation means 29. Alternatively, predetermined read-out conditions may be used when the final readout is carried out regardless of the characteristics of the preliminary read-out image signal SP. On the basis of the characteristics of the preliminary read-out image signal SP, the operation means 29 may adjust image processing conditions G2. The image processing conditions G2 are used in the image processing means 50 which carries out image processing on the image signal SQ. The image processing conditions G2 calculated by the operation means 29 may then be fed into the image processing means 50 as indicated by the broken line in FIG. 4. The operation means 29 may also adjust both the read-out conditions and the image processing conditions.

The aforesaid embodiment is applied to a radiation image read-out apparatus wherein a preliminary readout is carried out. However, the method for detecting an unexposed region in accordance with the present invention is also applicable to radiation image read-out apparatuses wherein no preliminary read-out operation is carried out, and only the aforesaid final read-out operation is carried out. In these cases, an image signal is obtained by use of predetermined read-out conditions. Based on the characteristics of the image signal, the conditions under which the image signal should be processed are calculated by an operation means. The image processing conditions thus calculated are taken into consideration when the image signal is processed.

The method for detecting an unexposed region in accordance with the present invention is not limited to the aforesaid embodiment wherein a stimulable phosphor sheet is used, and is also applicable to, for example, an X-ray image read-out apparatus wherein conventional X-ray film is used.

Figure 5:
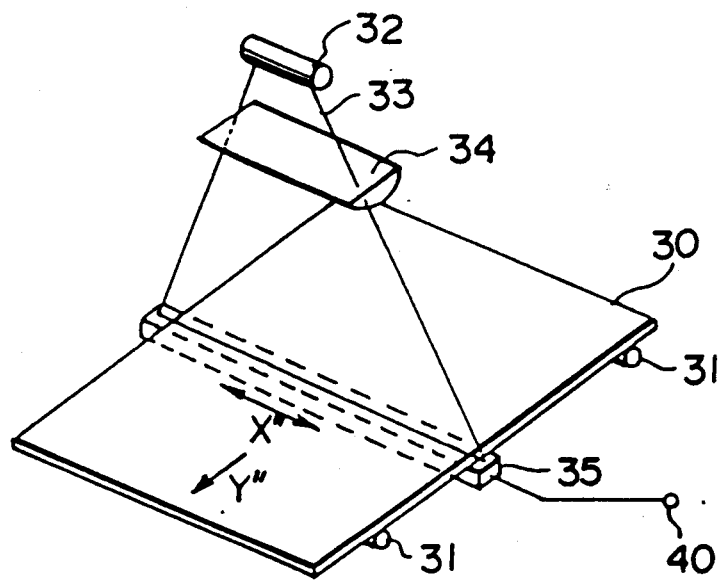
FIG. 5 is a perspective view showing an example of an X-ray image read-out apparatus wherein an X-ray image recorded on X-ray film is read out.

FIG. 5 is a perspective view showing an example of an X-ray image read-out apparatus wherein an X-ray image recorded on an X-ray film is read out.

With reference to FIG. 5, a sheet of X-ray film 30, on which an X-ray image has been recorded, is placed at a predetermined position and is conveyed in the direction indicated by the arrow Y" by a film conveyance means 31.

Reading light 33, which is produced by an elongated light source 32 extending in one direction, is converged by a cylindrical lens 34 and linearly irradiated onto the X-ray film 30 along the directions indicated by the arrow X", which are approximately normal to the direction indicated by the arrow Y". A MOS sensor 35 is positioned below the X-ray film 30 so that it can receive the reading light 33 which has passed through the X-ray film 30, the intensity of which light has been modulated in accordance with the X-ray image recorded on the X-ray film 30. The MOS sensor 35 comprises a plurality of solid state photoelectric conversion devices which are arrayed linearly at intervals equal to the intervals between the picture elements of the X-ray image along the directions indicated by the arrow X". As long as the X-ray film 30 is conveyed in the direction indicated by the arrow Y" while being exposed to the reading light 33, the MOS sensor 35 detects the reading light, which has passed through the X-ray film 30, at predetermined intervals corresponding to the intervals between the picture elements of the X-ray image along the direction indicated by the arrow Y".

Figure 6:
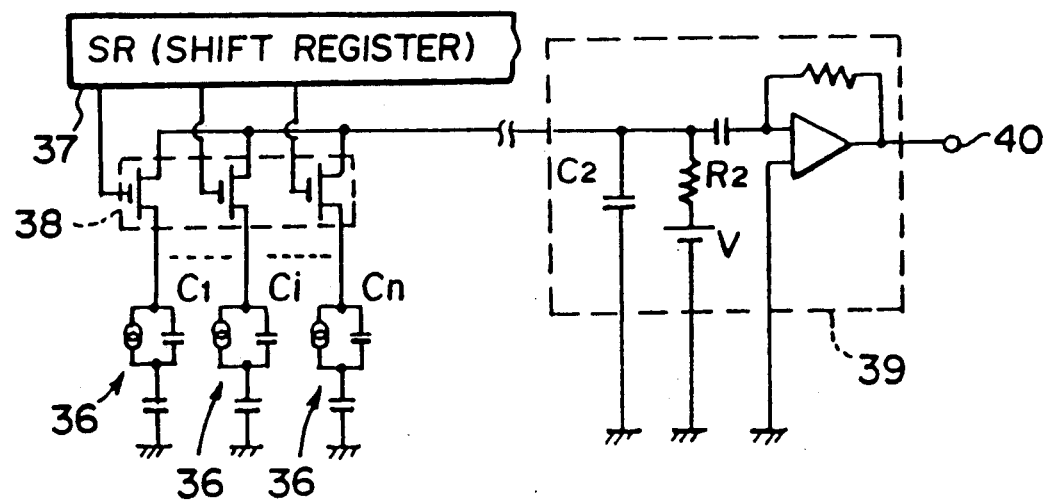
FIG. 6 is a circuit diagram showing an equivalent circuit for a MOS sensor.

FIG. 6 is a circuit diagram showing an equivalent circuit for the MOS sensor 35.

With reference to FIG. 6, photocarriers, which are generated when the reading light 33 impinges upon the solid state photoelectric conversion devices 36, 36, . . . , accumulate in capacitors $C_i$ ($i = 1, 2, \ldots, n$) of the solid state photoelectric conversion devices 36, 36, . . . The switches of a switch section 38 are turned on and off sequentially, which allows the number of photocarriers which have accumulated in the capacitors $C_i$ to be detected. A shift register 37 controls the switches of the switch section 38, and a time-serial image signal is obtained. The image signal is then amplified by a pre-amplifier 39 and is output at an output terminal 40 of the pre-amplifier 39.

The analog image signal output by the MOS sensor 35 is sampled and digitized into an image signal. Thereafter, unexposed regions are detected in the same manner as in the aforesaid embodiment, and the image processing conditions are determined on the basis of that part of the image signal corresponding to regions which have been exposed to radiation. In the embodiment shown in FIG. 5, the MOS sensor 35 may be replaced by a charge coupled device (CCD) or a charge priming device (CPD). Also, when the X-ray image is read out from the X-ray film 30, the X-ray film 30 may be two-dimensionally scanned with a light beam in the same manner as that described above for image readout from the stimulable phosphor sheet. Furthermore, instead of light which has passed through the X-ray film 30 being detected, light reflected by the X-ray film 30 may be detected.

The method for detecting an unexposed region in accordance with the present invention is applicable broadly when, based on the characteristics of an image signal, which has been detected from a recording medium used for storing a radiation image and is made up of a series of image signal components, a judgment is made as to which regions of the recording medium have been exposed to radiaiton.

In the aforesaid embodiment, a characteristic value is calculated which represents the maximum change in the values of the image signal components corresponding to positions located along each of a plurality of lines distributed over a region of the recording medium. Thereafter, the representative value, which is representative of the characteristic values calculated for the plurality of lines, is calculated and compared with a predetermined value, thereby allowing a judgment to be made as to whether the region has or has not been exposed to radiation. This embodiment may be modified so that the probability density function of the image signal components corresponding to the overall or to a partial region of the recording medium is utilized.

Figure 7A:
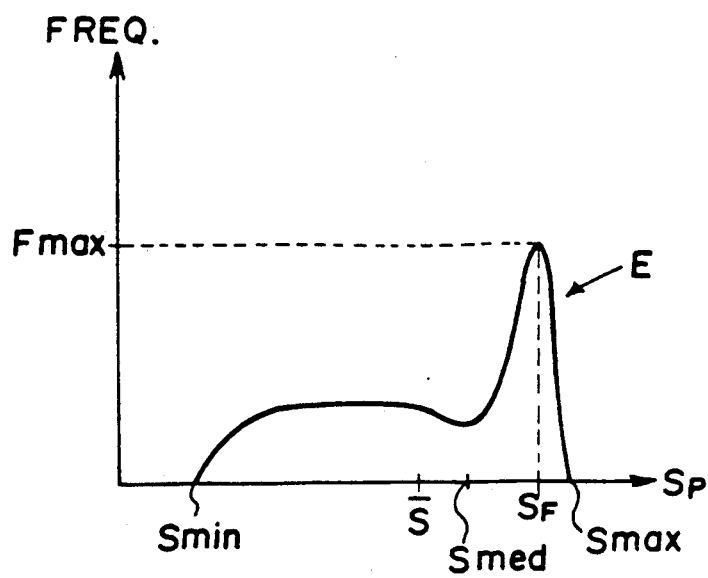
FIG. 7A is a graph showing the probability density function of the image signal components of the preliminary read-out image signal corresponding to the region 11c shown in FIGS. 1 and 2.
Figure 7B:
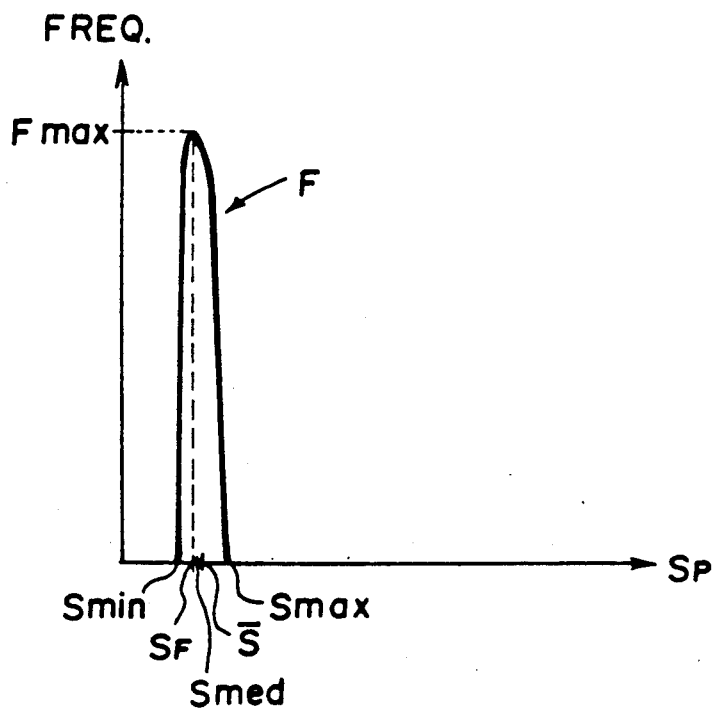
FIG. 7B is a graph showing the probability density function of the image signal components of the preliminary read-out image signal corresponding to the region 11d shown in FIGS. 1 and 2.

Such a modified embodiment will be described hereinbelow with reference to FIGS. 7A and 7B.

In order for a judgment to be made as to whether a region of a stimulable phosphor sheet has or has not been exposed to radiation , the probability density function of the image signal components of the preliminary read-out image signal SP corresponding to that region is created. FIGS. 7A and 7B are graphs showing the probability density functions of the image signal components of the preliminary read-out image signal SP corresponding to the regions 11c and 11d.

The region 11c has a radiation image stored therein, and the values of the corresponding image signal components of the preliminary read-out image signal SP vary over a relatively wide range, the range depending on the tissues of the object whose image was recorded. On the other hand, region 11d is an unexposed region, and therefore the values of the image signal components of the preliminary read-out image signal SP corresponding thereto are small and are dispersed over a relatively narrow range. Accordingly, the maximum value Smax of the preliminary read-out image signal SP corresponding to region 11c, the median value Smed of the preliminary read-out image signal SP corresponding to region 11c, the mean value S of the preliminary read-out image signal SP corresponding to region 11c, the difference between the maximum value Smax and the minimum value Smin of the preliminary read-out image signal SP corresponding to region 11c, and the value SF of the preliminary read-out image signal SP corresponding to region 11c, which occurs most frequently, i.e. the signal value corresponding to the maximum value Fmax of the probability density function, are larger than the same values calculated for the preliminary read-out image signal SP corresponding to the region 11d. Also, the values of the image signal components corresponding to a specific predetermined number of picture elements in region 11c are dispersed more widely than those corresponding to the same number of picture elements in region 11d. Therefore, the maximum frequency value Fmax of the probability density function of the image signal components of the preliminary read-out image signal SP corresponding to region 11c is smaller than that of the probability density function of the image signal components of the preliminary read-out image signal SP corresponding to region 11d.

Therefore, one of the values enumerated above is used as a characteristic amount which represents the characteristics of the probability density function, and the characteristic amount is compared with a predetermined amount. A judgment as to whether regions 11c and 11d have or have not been exposed to radiation is based on the results of the comparison made between the characteristic amount and the predetermined amount. In this embodiment, regions 11a, 11b, and 11c are detected as being exposed (i.e. as having radiation images stored thereon), and region 11d is detected as being unexposed.

After an unexposed region is detected in the manner described above, processing is carried out in the same manner as in the aforesaid embodiment.

What is claimed is:

1. A method for detecting an unexposed region, which comprises the steps of:
    i) after an image signal made up of a series of image signal components is detected from a recording medium on which a radiation image may be recorded, calculating a plurality of characteristic values, which represent the change in the values of the image signal components corresponding to positions located along each of a plurality of lines distributed over the overall region or over a partial region of said recording medium, from said image signal components corresponding to positions located along each said line,
    ii) calculating a representative value which is representative of said plurality of characteristic values calculated for the plurality of said lines,
    iii) comparing said representative value with a predetermined value, and
    iv) basing a judgment as to whether said region has or has not been exposed to radiation on the results of the comparison made between said representative value and said predetermined value.

2. A method for detecting an unexposed region, which comprises the steps of:
    i) after an image signal made up of a series of image signal components is detected from a recording medium on which a radiation image may be recorded, creating a probability density function of the image signal components corresponding to the overall region or to a partial region of said recording medium,
    ii) finding a characteristic amount which represents a specific characteristic of said probability density function,
    iii) comparing said characteristic amount with a predetermined amount, and
    iv) basing a judgment as to whether said region has or has not been exposed to radiation on the results of the comparison made between said characteristic amount and said predetermined amount.

* * * * *